United States Patent
Otto

(10) Patent No.: US 6,741,920 B1
(45) Date of Patent: May 25, 2004

(54) VEHICLE MEMORY KEY

(75) Inventor: Richard E. Otto, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 10/463,492

(22) Filed: Jun. 17, 2003

(51) Int. Cl.⁷ .............................................. E05B 49/00
(52) U.S. Cl. ........................................ 701/49; 340/5.6
(58) Field of Search ...................... 701/49, 36; 340/5.2, 340/5.3, 5.52, 5.6, 5.65, 5.66, 5.74; 307/10.3, 10.5, 10.6

(56) References Cited

U.S. PATENT DOCUMENTS

| | | | |
|---|---|---|---|
| 5,999,104 A | 12/1999 | Symanow et al. | |
| 6,005,488 A | 12/1999 | Symanow et al. | |
| 6,160,319 A | 12/2000 | Marougi et al. | |
| 6,198,996 B1 * | 3/2001 | Berstis ........................ | 701/36 |
| 6,216,068 B1 | 4/2001 | Gimmler et al. | |
| 6,230,084 B1 | 5/2001 | Kijima et al. | |
| 6,278,986 B1 | 8/2001 | Kamihira et al. | |
| 6,304,817 B1 | 10/2001 | Troedel | |
| 6,373,398 B2 | 4/2002 | Matsumoto | |
| 6,377,160 B1 | 4/2002 | Groeger | |
| 6,385,542 B1 | 5/2002 | Millington | |
| 6,430,488 B1 | 8/2002 | Goldman et al. | |

FOREIGN PATENT DOCUMENTS

| | | | | |
|---|---|---|---|---|
| EP | 1 116 840 A2 | * | 1/2001 | ........... E05B/49/00 |
| JP | 10-88878 | * | 7/1998 | ........... E05B/49/00 |

OTHER PUBLICATIONS

Lucy et al (US 2002/0118579 A1).*

* cited by examiner

Primary Examiner—Thu Nguyen
(74) Attorney, Agent, or Firm—Scott Charles Richardson; Robert L. Scott

(57) ABSTRACT

A vehicle memory key is configured for storing user preferences in a memory such as an encoded magnetic strip. The vehicle memory key is inserted into a key receptacle associated with operating the vehicle and one or more vehicle systems. A first insertion orientation of the key relative to the key receptacle is associated with a first set of user preferences and a second insertion orientation is associated with a second set of user preferences.

21 Claims, 8 Drawing Sheets

Multi-profile Key

VEHICLE MEMORY KEY

FIELD OF THE INVENTION

The present invention is generally related to vehicle systems. In particular, the present invention is related to vehicle ignition keys having coded records for identifying and asserting user preferences associated therewith.

BACKGROUND OF THE INVENTION

As vehicles and associated vehicle systems become more complex and feature rich, use and control thereof becomes more complicated. With the advent of vehicle-based Internet access, control complexity further increases. Not only may different users have different preferences or permissions for access, but Internet based services such as vehicle tracking may expand the way the Internet is used in the vehicular context. In addition, different users may prefer different settings for basic vehicle control systems.

As an example of basic vehicle system control, many vehicle seat position controls allow precise control of seat position, seat back position, seat angle, lumbar support, headrest support, seat height, and more. For vehicles serving several different drivers, managing seat position settings may become cumbersome particularly for persons having seat control requirements differing drastically from the previous driver. When the control of additional systems are considered, such as, for example, radio settings, climate control settings, and the like, the degree of complexity associated with control and management of preferences and settings can increase dramatically.

Some systems such as that described in U.S. Pat. No. 6,230,084, B1 issued to Kijima, et al., on May 8, 2001 provide sophisticated vehicle system characteristic monitoring and adjustment for each driver. The problem of managing individual driver preferences is addressed by the use of a system which reads an IC card to determine user preferences. The IC card described in Kijima may store one or more driver's preferences and may be inserted into a card reader associated with the vehicle. Copies of a master IC card may be distributed to drivers or alternatively each driver may have an individualized card.

In other sophisticated systems, such as that described in U.S. Pat. No. 6,216,068 B1 issued to Gimmler et al. on Apr. 10, 2001, driver behavior is sensed and long-term, short-term, and steady-speed components are used to perform adjustments in accordance with a corresponding adjustment characteristic. It should be noted that the system described in Gimmler et al appears to perform behavior-adaptive control regardless of specific knowledge about the individual driver and merely adapts based on continuing input from vehicle system behavior sensors. In still another system described in U.S. Pat. No. 6,278,986 B1, issued to Kimihira et al. on Aug. 21, 2001, a machine such as an engine, is trained to suit the characteristics of a user and/or using conditions.

In still other systems such as that described in U.S. Pat. No. 5,999,104 and U.S. Pat. No. 6,005,488 issued to Symanow et al. on Dec. 7, 1999 and Dec. 21, 1999 respectively, user controls may be reprogrammed to control different aspects of a device without changes to the device or software. None of these systems however address the need to easily determine and assert a particular user's preferences. Such easy assertion would not require, for example, a complicated, separate card reader, or the like.

Consequently, it would be desirable to provide a means to easily identify and assert a user's vehicle system preferences including Internet controls. Such easy assertion would preferably be associated with part of the normal operation of the vehicle, e.g. during ignition or the like.

SUMMARY OF THE INVENTION

According the present invention is directed to a vehicle memory key having two sides with different user preference related information encoded on each side. During normal operation of the vehicle, e.g. during key insertion for ignition, one side of the key is read and one set of user preferences asserted, and when the key is inserted such that the other side of key is read a different set of user preferences is asserted.

In one embodiment, the vehicle memory key of the present invention may be configured for storing user preferences in a memory such as an encoded magnetic strip or the like. The vehicle memory key may preferably be capable of being inserted into a key receptacle associated with operating the vehicle, e.g. an ignition module or cylinder, which may further be coupled to one or more vehicle systems. A first insertion orientation relative to the key receptacle may be associated with a first set of the user preferences, for example, for a first user. The first set of user preferences may be stored in a first portion of the memory such, for example, a magnetic strip. A second insertion orientation relative to the key receptacle may be associated with a second set of the user preferences stored in a second portion of the memory. It will be appreciated that the second set of user preferences is different from the first set of user preferences and is preferably associated with a different user, although it is possible that two different sets of preferences for the same user may be stored on respective sides of the vehicle memory key.

In the vehicle memory key of the present invention, first and second portions of the memory respectively may be configured to contain encoded information, e.g. magnetically encoded information associated with the first and second set of user preferences. The encoded information is then capable of being read by a reading device associated with the key receptacle, e.g. a device capable of reading the magnetically encoded information. It should also be noted that in accordance with alternative exemplary embodiments, the first set of user preferences is selectively associated, e.g. through the use of a switch or the like on one side of the vehicle memory key, with more than one user, and the second set of user preferences is selectively associated, e.g. through the use of another switch or the like on the other side of the vehicle memory key, also with more than one user.

In accordance with various exemplary embodiments, it will be appreciated that the one or more vehicle systems may include one or more of a window control system, a seat position control system, a steering column position control system, an audio control system, a video control system, a vehicle use tracking system, an Internet interface control system, a climate control system, a ride control system, a mirror control system, and a navigation system, or the like.

In a method for determining user preferences in accordance with exemplary embodiments of the present invention, user preferences associated with the vehicle may be stored in a memory, the vehicle memory key capable of being inserted into a key receptacle associated with operating the vehicle and one or more vehicle systems. A first set of the user preferences may be associated with a first insertion orientation relative to the key receptacle by storing the first set of user preferences in a first portion of the memory, and a second set of the user preferences may be associated with a second insertion orientation relative to the key receptacle by storing the second set of user preferences in a second portion of the memory. It should be noted that the second set of user preferences is preferably different from the first set of the user preferences.

Information associated with the first and second set of user preferences may be encoded in the first and second portions of the memory respectively such that the encoded information from the first portion of the memory may be read if the vehicle memory key is inserted in the first insertion orientation, and the encoded information from the second portion of the memory may be read if the vehicle memory key is inserted in the second insertion orientation. The user preferences may be asserted in the one or more vehicle systems which systems may include one or more of a window control system, a seat position control system, a steering column position control system, an audio control system, a video control system, a vehicle use tracking system, an Internet interface control system, a climate control system, a ride control system, a mirror control system, and a navigation system, or the like. In accordance with alternative exemplary embodiments, multiple portions of the first set of user preferences may be selectively associated, e.g. through the use of a switch, with a more than one user, and multiple portions of the second set of user preferences may similarly be selectively associated with more than one user.

In accordance with yet other alternative exemplary embodiments of the present invention, a system for asserting user preferences in a vehicle may include a vehicle memory key for storing, in a memory, user preferences associated with one or more vehicle systems of the vehicle. The vehicle memory key has a first insertion orientation associated with a first set of the user preferences stored in a first portion of the memory; and a second insertion orientation associated with a second set of the user preferences stored in a second portion of the memory. The second set of user preferences is preferably different from the first set of the user preferences. The system may also preferably include a key receptacle for receiving the vehicle memory key. The key receptacle may be associated with operating the vehicle, e.g. an ignition module or cylinder. The key receptacle may be configured to read the first or the second set of the user preferences when the key is inserted in the first or second insertion orientation. One or more vehicle system control modules may be coupled to the key receptacle such that they may be configured to receive the first or second set of user preferences read by the key receptacle. The system may further be equipped with a reading device associated with the key receptacle, and the first and second portions of the memory respectively may contain encoded information associated with the first and second set of user preferences. The encoded information is preferably capable of being read by reading device.

As previously described, the one or more vehicle systems may include one or more of a window control system, a seat position control system, a steering column position control system, an audio control system, a video control system, a vehicle use tracking system, an Internet interface control system, a climate control system, a ride control system, a mirror control system, and a navigation system, or the like. In accordance with various alternative exemplary embodiments, the first set of user preferences may be selectively associated, e.g. through the use of a switch, with a more than one user, and the second set of user preferences may be selectively associated, e.g. with another switch, with a more than one user on the other side of the vehicle memory key.

In still another exemplary embodiment in accordance with the present invention, a method may be used for determining user preferences associated with one or more vehicle systems of a vehicle using a vehicle memory key. The exemplary method includes storing user preferences associated with the vehicle in a memory associated with the vehicle memory key, associating a first set of the user preferences with a first insertion orientation relative to a key receptacle by storing the first set of user preferences in a first portion of the memory, and associating a second set of the user preferences with a second insertion orientation relative to the key receptacle by storing the second set of user preferences in a second portion of the memory. It will be appreciated that the second set of user preferences is preferably different from the first set of the user preferences. The vehicle memory key may be inserted into the key receptacle which may further be associated with operating the vehicle and the vehicle systems. Once inserted, the first set of user preferences may be read from the first portion of the memory if the vehicle memory key is inserted in the first insertion orientation, and the second set of user preferences may be read from the second portion of the memory if the vehicle memory key is inserted in the second insertion orientation. The user preferences may then be asserted in the one or more vehicle systems; such as one or more of a window control system, a seat position control system, a steering column position control system, an audio control system, a video control system, a vehicle use tracking system, an Internet interface control system, a climate control system, a ride control system, a mirror control system, and a navigation system, or the like. The first set of user preferences may alternatively be selectively associated with a first more than one user, e.g. through the use of a switch, and similarly the second set of user preferences may be selectively associated with more than one user.

In still another embodiment, a vehicle memory key stores user Internet preferences associated with one or more vehicle Internet terminals in a memory. The vehicle memory key is preferably capable of being inserted into a key receptacle associated with operating the vehicle and Internet related vehicle systems. The vehicle memory key preferably comprises a first insertion orientation relative to the key receptacle, associated with a first set of user Internet preferences stored in a first portion of the memory. A second insertion orientation relative to the key receptacle may further be provided, the second insertion orientation associated with a second set of user Internet preferences stored in a second portion of the memory. It should be noted that the second set of user preferences is preferably different from the first set of the user preferences. The first and second portions of the memory respectively contain encoded information associated with the first and second set of user Internet preferences which information is preferably capable of being read by a reading device associated with the key receptacle. It should be noted that the one or more Internet related vehicle systems may preferably include one or more of an Internet based vehicle use tracking system, and an Internet access control system. The user Internet preferences may include one or more of: vehicle use tracking system settings and Internet access control settings. The first set of user Internet preferences may be selectively associated with a first one user, and the second set of user Internet preferences may be selectively associated with a second user different from the first one user.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

The present invention provides a key having two sides with different user preference related information encoded into each side. During normal operation of the vehicle, e.g. during key insertion for ignition, one side of the key is read and one set of user preferences asserted, when the key is inserted such that the other side of key is read, a different set of user preferences is asserted. Reference will now be made in detail to the presently preferred embodiments of the invention, examples of which are illustrated in the accompanying drawings.

Figure 1:
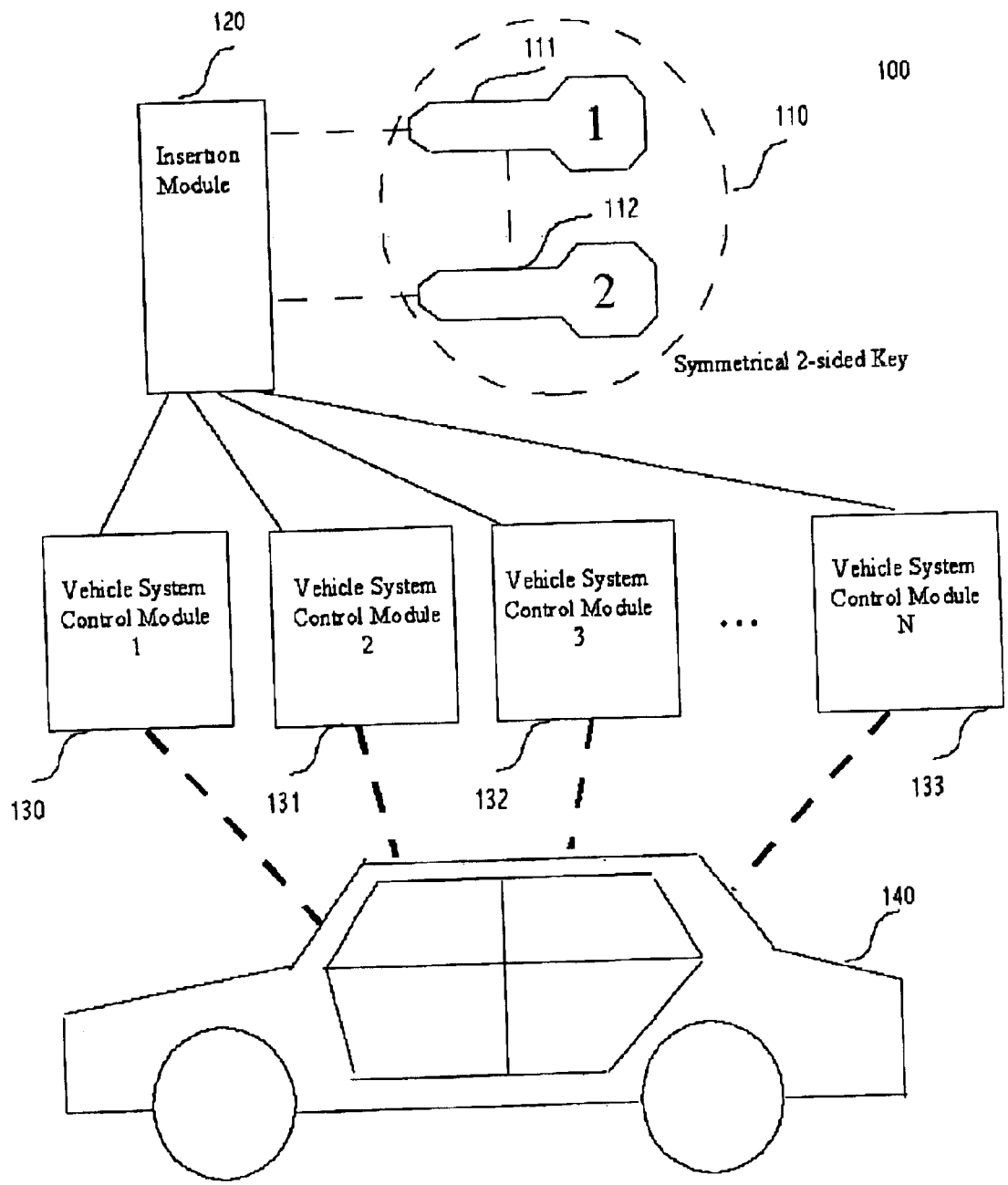
FIG. 1 is a diagram illustrating an exemplary vehicle memory key and system in accordance with various exemplary embodiments of the present invention.

In accordance with various exemplary embodiments of the present invention, FIG. 1 illustrates scenario 100 wherein two sided key 110 is shown with sides 1 111 and 2 112 respectively. It should be noted that key 110 may resemble a conventional key in the sense that it may be configured with "teeth" to be inserted into a tumbler for conventional purposes associated with, for example, operating an ignition cylinder and may further be coded with magnetic information which may be separately read. Alternatively, key 110 may be solely electronic such as a two sided magnetic strip or may fit into a key jack wherein the key may be fit into the jack in two or more ways for two or more different preferences to be read. In an alternative exemplary embodiment, key 110 may have multiple encoding on each side. Key 110 of the present invention may be encoded with information associated with user preferences for vehicle system settings and control as will be described in greater detail herein after. While the key of the present invention is preferably passive, e.g. has no active electronic components or power, an active key may also be used in the manner described in greater detail herein below wherein the key may have battery power and may have some circuitry to control the selection of different user profiles on each side thereof. Although some vehicle systems, such as those previously described herein, do provide improvements related to the control of settings, few address the use of conventional style keys in improved systems. Those that do provide for the use of a more conventionally styled key fail to take advantage of a typical key's dual sided nature.

In some improved key systems, such as that described in U.S. Pat. No. 6,160,319 issued to Marougi et al. on Dec. 12, 2000, a key may be outfitted with circuit traces to allow connections to various systems and to improve the antenna size by adding the ignition circuit to the antenna circuit. It is important to note that the key described in Marougi is configured to operate the same regardless of the orientation of the key upon insertion in direct contrast to the present invention.

It will be further appreciated that key 110 of the present invention will be inserted into insertion module 102 which is preferably a module equipped with a key reception slot, such as, for example, a convention ignition cylinder, and a sensor and processor such that the user preferences associated with key 110 may be read and asserted on vehicle system control modules 130 1–133 N associated with vehicle 140.

Figure 2A:
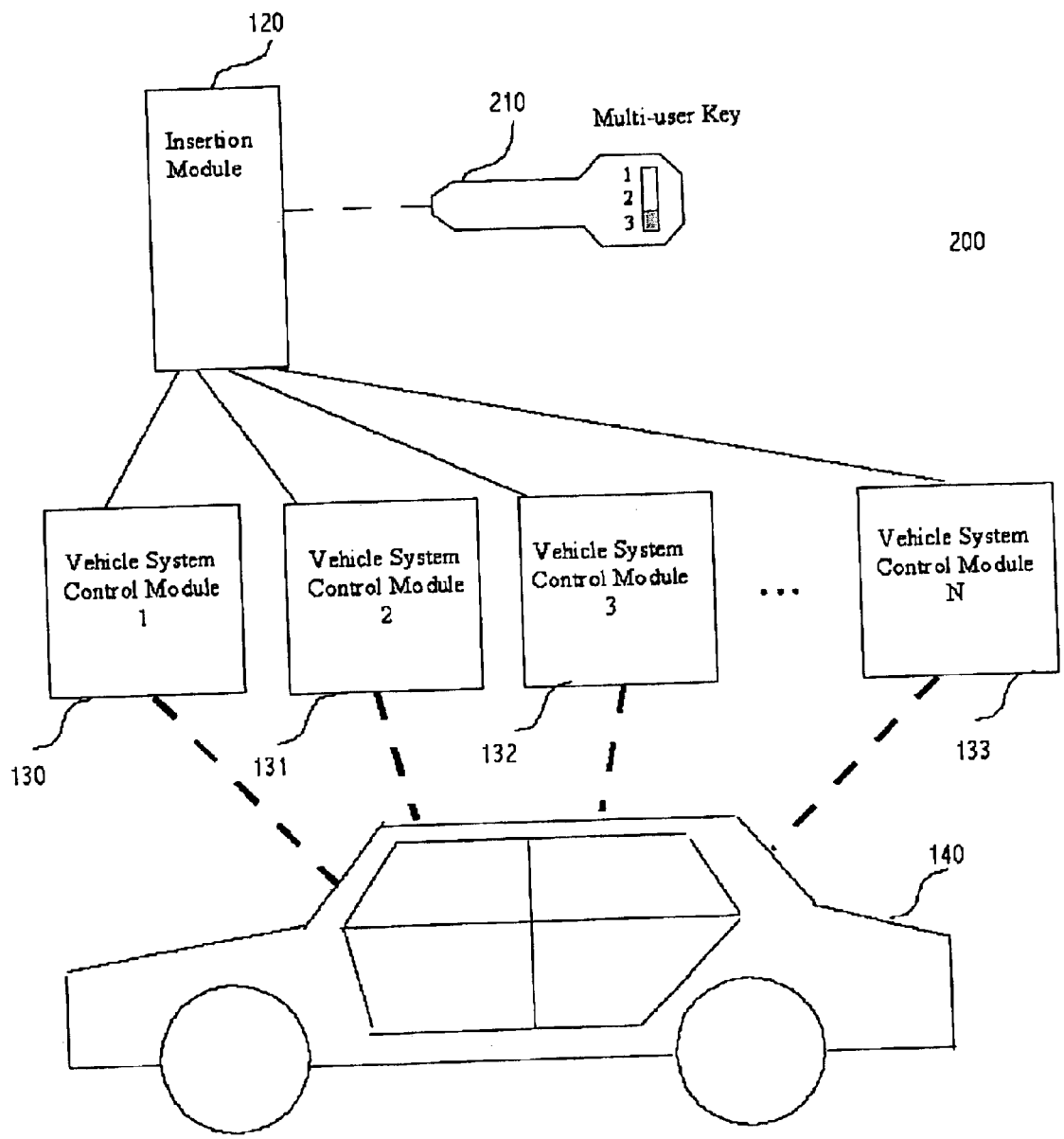
FIG. 2A is a diagram illustrating an exemplary multi-user vehicle memory key and system in accordance with various alternative exemplary embodiments of the present invention.
Figure 2B:
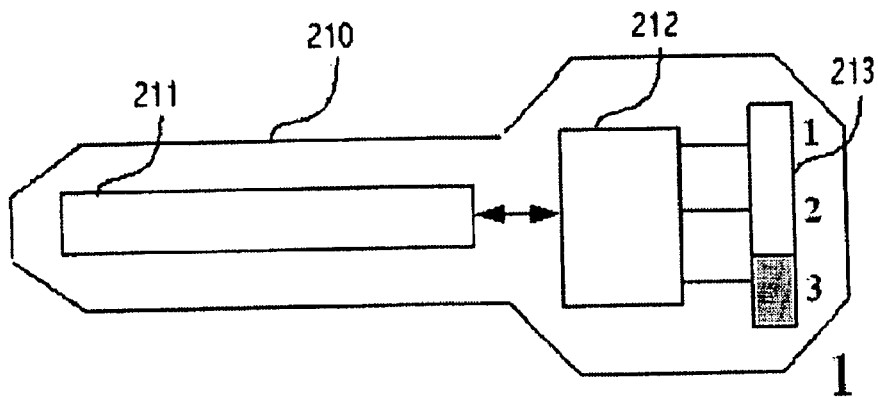
FIG. 2B is a diagram further illustrating an exemplary multi-user vehicle memory key in accordance with various alternative exemplary embodiments of the present invention.
Figure 2B:
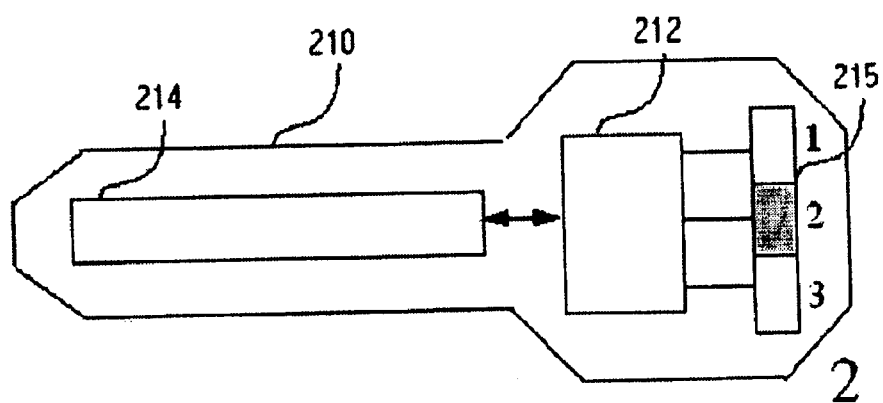

As previously described, the key of the present invention may be configured to allow for multiple user profiles per side. Thus, multi-user scenario 200, as shown in FIG. 2A, includes key 210 which is preferably a two-sided key capable of multi-user programming, As further illustrated in FIG. 2B, key 210 may be equipped with processor 212 and reconfigurable encoding elements 211 and 214 for each side 1 and 2 of key 210. Key 210 may be powered either externally from the vehicle battery system or may preferably contain a small battery as would be well known. By changing the position of switches 213 and 215 respectively, each side 1 and 2 of multi-user two sided key 210 can be changed to several different settings, for example three as shown in the diagram, resulting in different user preference settings which can be sent to reconfigurable encoding elements 211 and 214. Also, as vehicle setting are changed, such settings may be written back to reconfigurable coding elements 211 and 214 by, for example, an external sensor and writer module, as will be described in greater detail herein after, requiring that processor 212 read and update settings as they are changed. Further, while switches 213 and 215 are shown as slide switches it will be appreciated that any suitable type of switch may be used to select user profiles for each side. It should be noted that the different setting may be used for different preferences for the same user or may represent settings for different users. It would further be possible to outfit key 210 with a small display (not shown) and a simple two or three button control for determining the user preference setting for each side of key 210.

Figure 3:
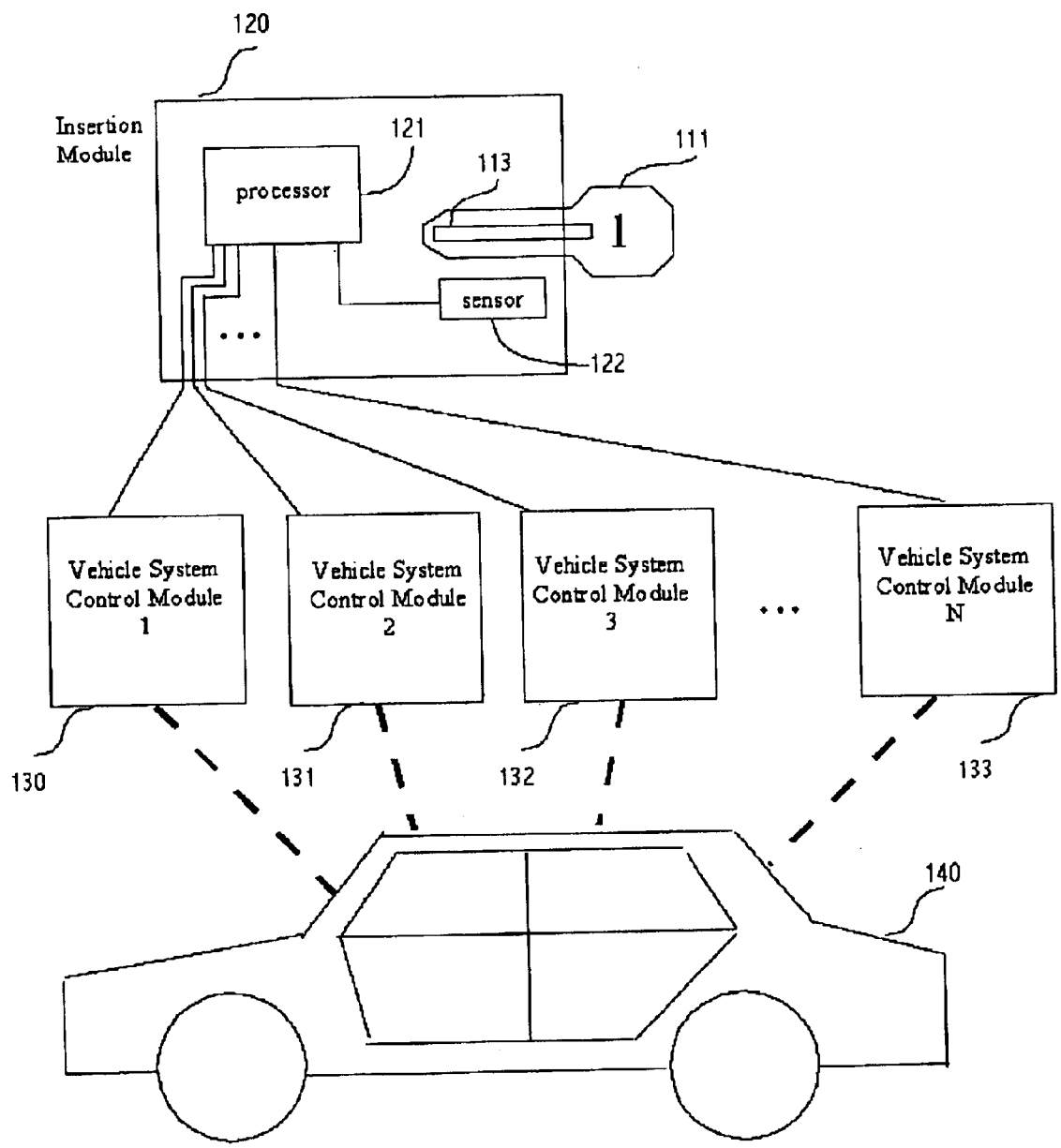
FIG. 3 is a diagram illustrating an exemplary vehicle memory key engaged with an exemplary insertion module and system in accordance with various exemplary embodiments of the present invention.
Figure 4:
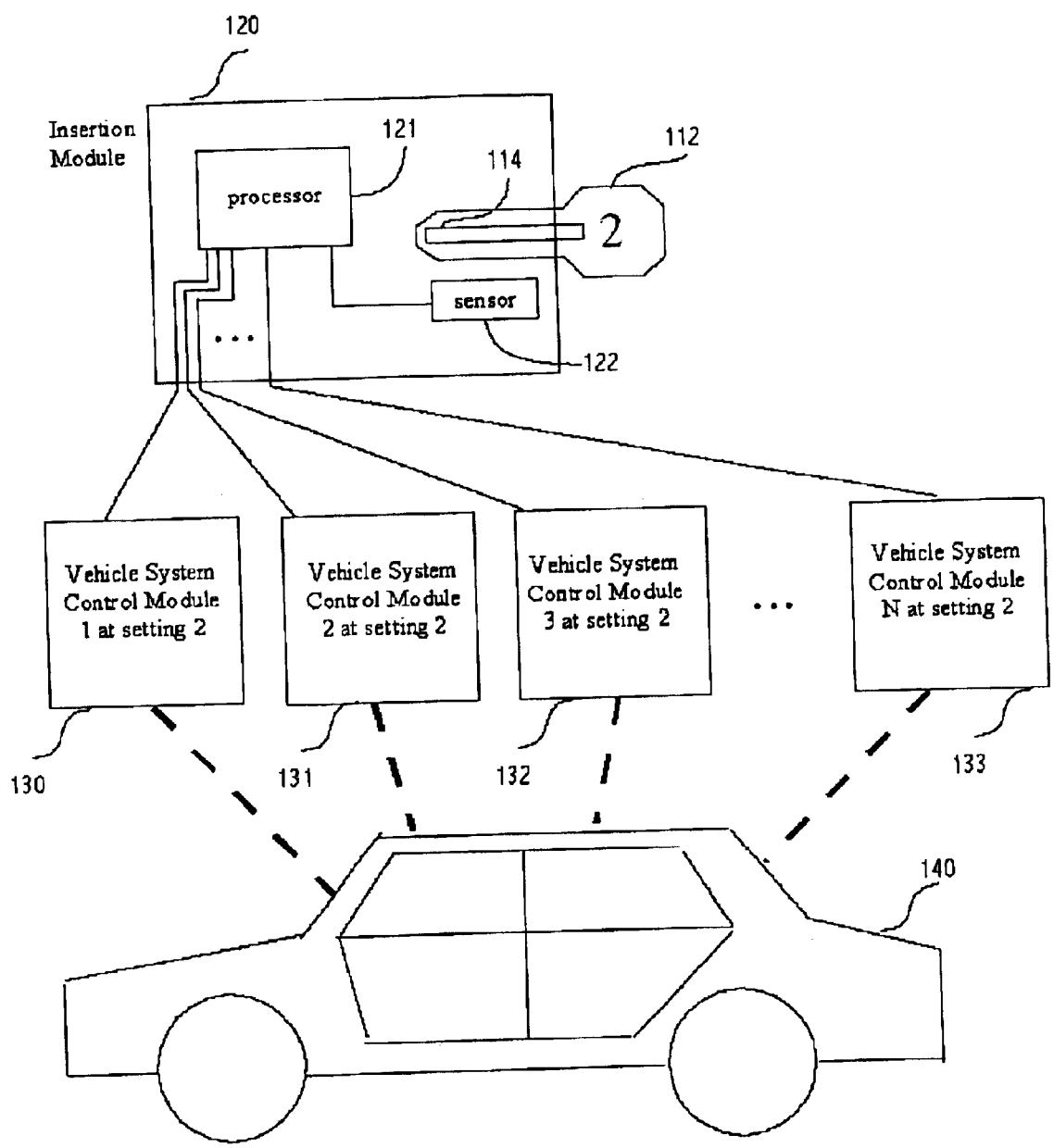
FIG. 4 is a diagram further illustrating an exemplary vehicle memory key engaged with an exemplary insertion module and system in accordance with various exemplary embodiments of the present invention.
Figure 5:
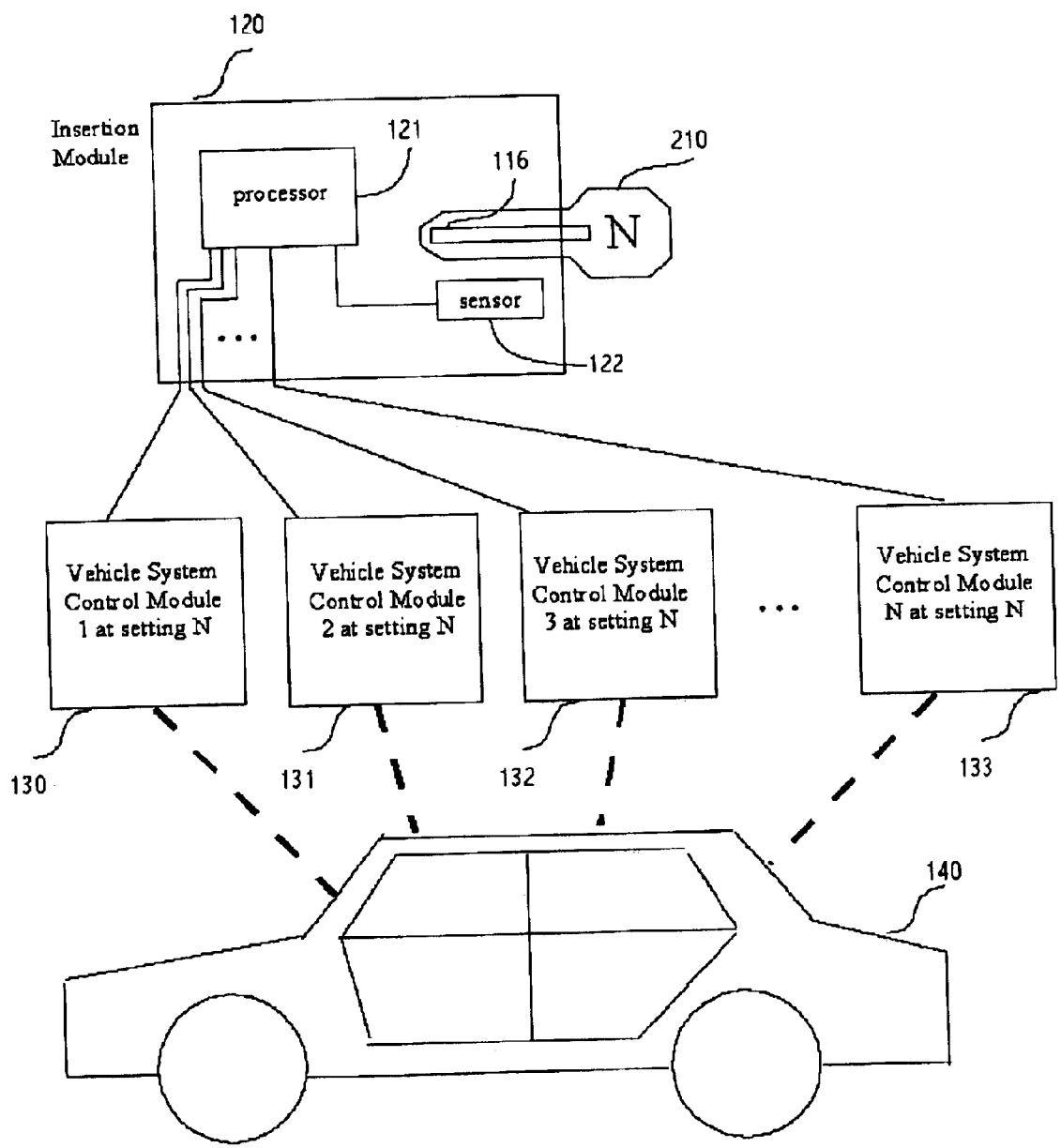
FIG. 5 is a diagram illustrating an exemplary vehicle memory key engaged with an exemplary insertion module and system in accordance with various alternative exemplary embodiments of the present invention.

In operation, as shown in FIG. 3, key 110 may be inserted, for example, with side 1 111 active. Key 110 may preferably be configured with coded information such as, for example, exemplary magnetic strip 113 which may then be read by sensor 122. It should be noted that magnetic strip 113 may contain user preferences or information associated with user preferences for vehicle system control module settings. Sensor 122 may be connected to processor 121 such that information associated with user preferences, once read, may be processed and implemented, for example, through vehicle system control modules 1 130–N 133. It will be appreciated that sensor 122 may be configured to read preferences during, for example, key insertion. Preferences may subsequently be asserted at some point after insertion such as, for example, after engine start when vehicle 140 is operating on system power, e.g. alternator power, such that battery levels are not unnecessarily drained. When key 110 is inserted with side 2 112 active, as illustrated in FIG. 4, such that magnetic strip 114 is in proximity to sensor 122, a different set of user preferences may be read. It will further be appreciated that magnetic strips 113 and 114 may be set and reset, for example, by sensor 122 as preferences are changed and adjusted in a manner as would be well appreciated in the art. In a similar manner, multi-preference key 210, as shown in FIG. 5, may be inserted into insertion module 120 and preferences read by sensor 122. As vehicle settings are changed, new values may be written to reconfigurable encoding elements 211 and 214 associated with key 210. New settings may be read by processor 212 and updated.

Figure 6:
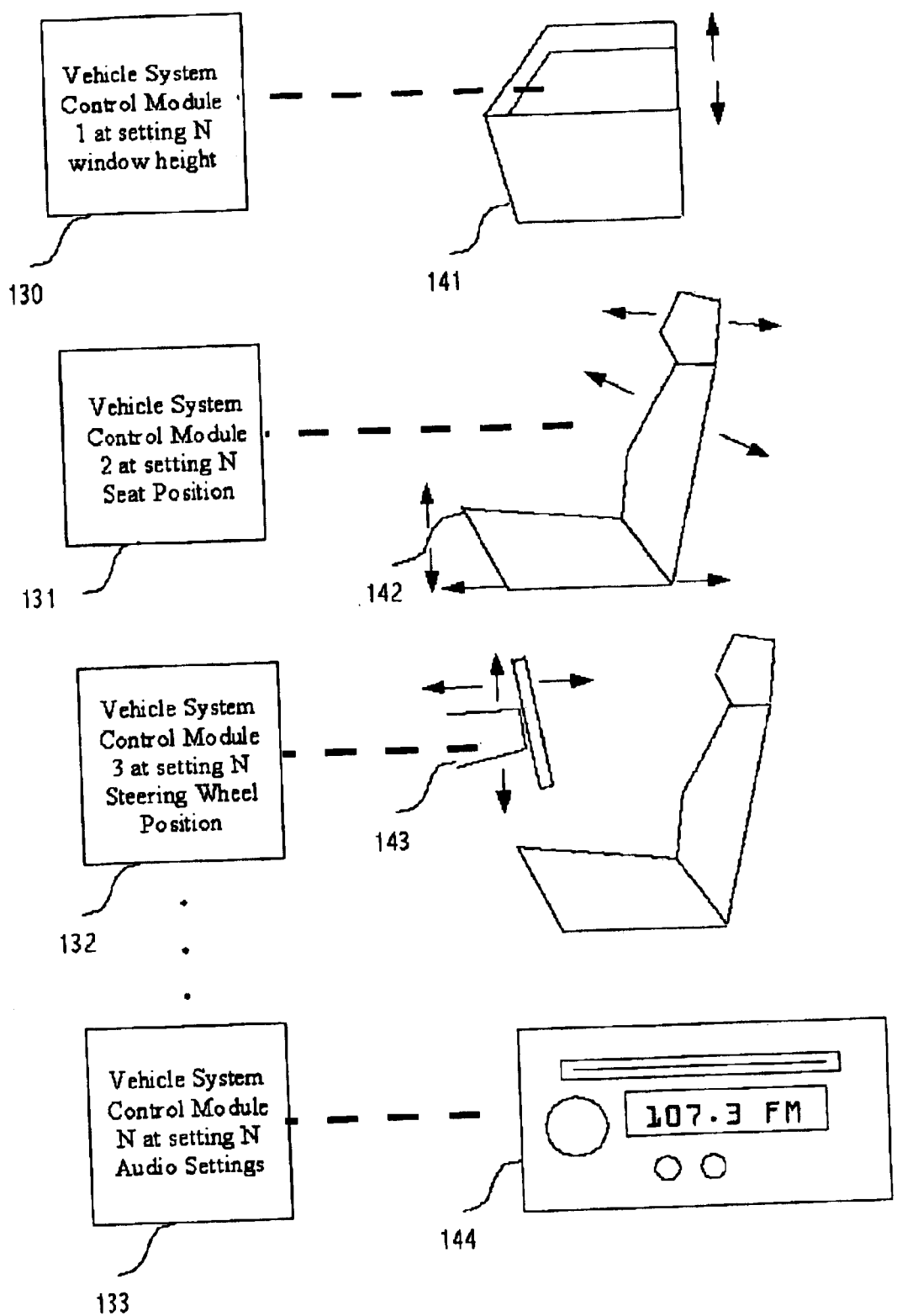
FIG. 6 is a diagram illustrating several exemplary vehicle system control modules engaging several exemplary vehicle systems in accordance with various exemplary embodiments of the present invention.

Reference has been made to exemplary vehicle system control modules 130–133 and attendant settings available from the key of the present invention. FIG. 6 illustrates exemplary vehicle system control modules 130–133 in greater detail. As shown, exemplary vehicle system control module 130 may be used to control vehicle window settings. A particular information or code value on key 110 or key 210 associated with windows may be read by sensor 122 and forwarded to the correct vehicle system control module, in this case, vehicle system control module 130 for window control. It will be appreciated that if setting information is encoded, a wide range of possible setting may be compactly stored. In addition, to the extent that processors, e.g. either processor 212 on key 210 and/or processor 121 associated with insertion module 120, can be used to extract and process encoded information, vehicle settings stored on exemplary 110 and 210 may be stored in an even more compact manner.

Other vehicle system control modules 131–133 may be used to control other systems. Vehicle system control module 131, for example, may be used to control seat settings including seat back angle, seat height, seat position forward or backward, head rest position, and the like; vehicle system control module 132, for example, may be used to control steering wheel column settings including steering column angle, steering column position forward or backward; and vehicle system control module 133, for example, may be used to control audio settings including favorite radio station or CD track, volume, tone, and the like. It will also be appreciated that while four vehicle system control modules are shown by way of illustration, more or less could be controlled using the key of the present invention provided that the vehicle systems are equipped with automated control interfaces that can interface, for example, with insertion module 120. Such systems could include but are not limited to a video control system, a vehicle use tracking system, an Internet interface control system, a climate control system, a ride control system (e.g. active suspension control), a mirror control system, a navigation system, and the like. An exemplary Internet interface control could further include personal Internet settings such as content settings, advertising settings, privacy settings, navigation settings such as Internet/WWW-based GPS navigation as will be described in greater detail hereinafter.

Figure 7:
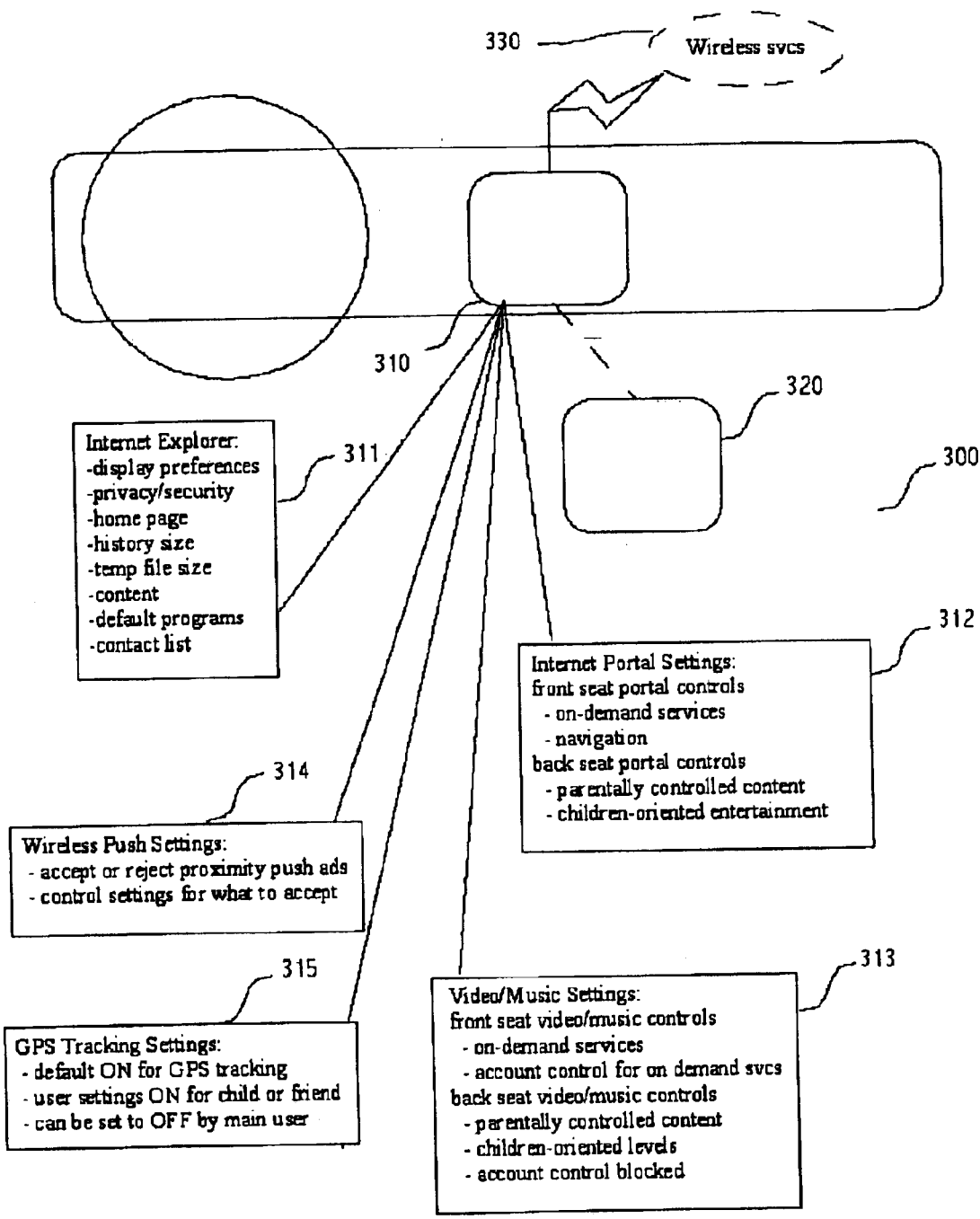
FIG. 7 is a diagram illustrating several exemplary vehicle Internet and related controls in accordance with various exemplary embodiments of the present invention.

Since Internet access is rapidly expanding within the mobile realm through the use of enabling technologies such as wireless application protocols (WAP) and the like, the present invention may be adapted for use in storing various exemplary setting associated with Internet access, privacy, content delivery, and the like. FIG. 7 illustrates scenario 300 where a typical vehicle dashboard is equipped with an Internet access terminal 310 and alternatively, an additional auxiliary terminal 320. Terminal 310 may be connected through an air interface to exemplary wireless services 330, which services may include a variety of services from a variety of providers. It should be noted that wireless services 330 is shown as a single "cloud" for illustrative purposes. It will be appreciated that wireless services may be provided through a home Internet and/or wireless service provider, may be locally connected through a home Internet and/or wireless service provider, or may be "pushed" through one of several direct proximity protocols as are known in the art, or through a roaming feature managed through a subscriber's home service location. It will be appreciated that such features would be provided in conjunction with a GPS or other location tracking system such as might be used by a wireless service provider to ascertain the present service location of a subscriber. Such services or offers might be related to, for example, local restaurant, merchant, government, or the like.

As shown in block 311, basic Internet settings, exemplified by the various settings associated with a typical web browser, for example, Internet Explorer, can be stored on the key of the present invention for configuring access for the present user. Such settings may include display related preferences such as font or color, and may further include settings such as privacy, security, home page, history file size, Internet temp file size, content, default programs (e.g. mail engine), contact lists or the like. Since modern vehicles, particularly family oriented vehicles, may now or may soon have the capability for multiple Internet portals, control of additional portals is desirable. As shown in block 312, portal control settings may further be stored in the key of the present invention. Control of on-demand service for an exemplary "front seat" or driver portal may be set to one configuration while control of the "back seat" or, for example, exemplary remote terminal 320 may be set for child oriented content and may be inhibited from, for example, the provision of on demand services. Likewise, video or music content settings, as shown in block 313, may be stored for front seat and back seat portals. It will be appreciated that while the terms front seat and back seat are used herein for exemplary purposes, portals may be located anywhere in the vehicle. Further, while the exemplary number of portals is illustrated as two, settings for more portals could easily be stored in accordance with exemplary embodiments of the present invention.

As shown in block 314, the key of the present invention, may further store preferences related to the acceptance or rejection of push content. Location is established either by GPS, wireless network location determining means, proximity, or the like. Alternatively, the user may store specific types of special promotions the receipt of which are desired, such as restaurant specials or kids oriented promotions. In addition to controlling push content, GPS tracking system controls may be stored in the key of the present invention as shown in block 315. For example, a GPS tracking system may allow a parent to remotely track the present location of the exemplary vehicle through a secure Internet site to which the parent previously subscribed. The vehicle key of the present invention may be configured to allow only one person to disable such a feature which would otherwise be normally ON. Thus, when a friend or child was using the vehicle, the parent would be able to determine its present location and the user, e.g. child or friend, would be prevented from disabling this feature.

It is believed that the vehicle memory key of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A vehicle memory key for storing user preferences associated with a vehicle in a memory, the vehicle memory key capable of being inserted into a key receptacle associated with operating the vehicle and one or more vehicle system, the vehicle memory key comprising:

a first insertion orientation relative to the key receptacle, the first insertion orientation associated with a first set of the user preferences stored in a first portion of the memory; and a second insertion orientation relative to the key receptacle, the second insertion orientation associated with a second set of the user preferences stored in a second portion of the memory, the second set of user preferences different from the first set of the user preferences.

2. The vehicle memory key of claim 1, wherein the first and second portions of the memory respectively contain encoded information associated with the first and second set of user preferences, the encoded information capable of being read by a reading device associated with the key receptacle.

3. The vehicle memory key of claim 1, wherein the one or more vehicle systems include one or more of a window control system, a seat position control system, a steering column position control system, an audio control system, a video control system, a vehicle use tracking system, an Internet interface control system, a climate control system, a ride control system, a mirror control system, and a navigation system.

4. The vehicle memory key of claim 1, wherein the first set of user preferences is selectively associated with a first more than one user, and the second set of user preferences is selectively associated with a second more than one user different from the first more than one user.

5. A method for determining user preferences associated with one or more vehicle systems of a vehicle using a vehicle memory key, the method comprising the steps of:

storing user preferences associated with the vehicle in a memory associated with the vehicle, the vehicle memory key capable of being inserted into a key receptacle associated with operating the vehicle and one or more vehicle systems, associating a first set of the user preferences with a first insertion orientation relative to the key receptacle by storing the first set of user preferences in a first portion of the memory, and associating a second set of the user preferences with a second insertion orientation relative to the key receptacle by storing, the second set of user preferences in a second portion of the memory, the second set of user preferences different from the first set of the user preferences.

6. The method of claim 5, further comprising the steps of:

encoding information associated with the first and second set of user preferences in the first and second portions of the memory respectively, and reading the encoded information from the first portion of the memory if the vehicle memory key is inserted in the first insertion orientation, and reading the encoded information from the second portion of the memory if the vehicle memory key is inserted in the second insertion orientation.

7. The method of claim 6, further including the step of asserting the user preferences in the one or more vehicle systems, wherein the one or more vehicle systems include one or more of a window control system, a seat position control system, a steering column position control system, an audio control system, a video control system, a vehicle use tracking system, an,Internet interface control system, a climate control system, a ride control system, a mirror control system, and a navigation system.

8. The method of claim 5, wherein the first set of user preferences selectively associated with a first more than one user, and the second set of user preferences is selectively associated with a second more than one user different from the first more than one user.

9. A system for asserting user preferences in a vehicle, the system comprising:

a vehicle memory key for storing user preferences associated with one or more vehicle systems of the vehicle in a memory, the vehicle memory key comprising:

a first insertion orientation associated with a first set of the user preferences stored in a first portion of the memory; and a second insertion orientation associated with a second set of the user preferences stored in a second portion of the memory, the second set of user preferences different from the first set of the user preferences a key receptacle for receiving the vehicle memory key, the key receptacle associated with operating the vehicle, the key receptacle configured to read the first or the second set of the user preferences when the key is inserted thereinto in the first or second insertion orientation; and one or more vehicle system control modules coupled to the key receptacle, the one or more vehicle system control modules for receiving the first or second set of user preferences read by the key receptacle.

10. The system of claim 9, further comprising a reading device associated with the key receptacle, wherein the first and second portions of the memory respectively contain encoded information associated with the first and second set of user preferences, the encoded information capable of being read by reading device.

11. The system of claim 9, wherein the one or more vehicle systems include one or more of a window control system, a seat position control system, a steering column position control system, an audio control system, a video control system, a vehicle use tracking system, an Internet interface control system, a climate control system, a ride control system, a mirror control system, and a navigation system.

12. The system of claim 9, wherein the first set of user preferences is selectively associated with a first more than one user, and the second set of user preferences is selectively associated with a second more than one user different from the first more than one user.

13. A method for determining user preferences associated with one or more vehicle systems of a vehicle using a vehicle memory key, the method comprising the steps of:

storing user preferences associated with the vehicle in a memory associated with the vehicle memory key, associating a first set of the user preferences with a first insertion orientation relative to a key receptacle by storing the first set of user preferences in a first portion of the memory, and associating a second set of the user preferences with a second insertion orientation relative to the key receptacle by storing the second set of user preferences in a second portion of the memory, the second set of user preferences different from the first set of the user preferences.

14. The method of claim 13, further comprising the steps of:

inserting the vehicle memory key into the key receptacle associated with operating the vehicle and one or more vehicle systems, and reading the first set of user preferences from the first portion of the memory if the vehicle memory key is inserted in the first insertion orientation, and reading the second set of user preferences from the second portion of the memory if the vehicle memory key is inserted in the second insertion orientation.

15. The method of claim 14, further including the step of asserting the user preferences in the one or more vehicle systems, wherein the one or more vehicle systems include one or more of a window control system, a seat position control system, a steering column position control system, an audio control system, a video control system, a vehicle use tracking system, an Internet interface control system, a climate control system, a ride control system, a mirror control system, and a navigation system.

16. The method of claim 13, wherein the first set of user preferences is selectively associated with a first more than one user, and the second set of user preferences is selectively associated with a second more than one user different from the first more than one user.

17. A vehicle memory key for storing user Internet preferences associated with one or more vehicle Internet terminals in a memory, the vehicle memory key capable of being inserted into a key receptacle associated with operating the vehicle and one or more Internet related vehicle systems, the vehicle memory key comprising:

a first insertion orientation relative to the key receptacle, the first insertion orientation associated with a first set of the user Internet preferences stored in a first portion of the memory; and a second insertion orientation relative to the key receptacle, the second insertion orientation associated with a second set of the user Internet preferences stored in a second portion of the memory, the second set of user preferences different from the first set of the user preferences.

18. The vehicle memory key of claim 17, wherein the first and second portions of the memory respectively contain encoded information associated with the first and second set of user Internet preferences, the encoded information capable of being read by a reading device associated with the key receptacle.

19. The vehicle memory key of claim 17, wherein the one or more Internet related vehicle systems include one or more of an Internet based vehicle use tracking system, and an Internet access control system.

20. The vehicle memory key of claim 19, wherein the user Internet preferences include one or more of: vehicle use tracking system settings, and Internet access control settings.

21. The vehicle memory key of claim 17, wherein the first set of user Internet preferences is selectively associated with a first more than one user, and the second set of user Internet preferences is selectively associated with a second more than one user different from the first more than one user.

* * * * *